(12) United States Patent
Wong

(10) Patent No.: US 7,454,640 B1
(45) Date of Patent: Nov. 18, 2008

(54) SYSTEM AND METHOD FOR PROVIDING A THERMAL SHUTDOWN CIRCUIT WITH TEMPERATURE WARNING FLAGS

(75) Inventor: Kern W. Wong, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 416 days.

(21) Appl. No.: 11/206,704

(22) Filed: Aug. 18, 2005

(51) Int. Cl.
*G05F 3/26* (2006.01)
(52) U.S. Cl. .................. 713/324; 702/130; 702/132; 340/870.16; 340/870.17; 327/513; 327/538; 323/315
(58) Field of Classification Search .................. 713/324; 702/130, 132; 340/870.16, 870.17; 327/513, 327/538; 323/315
See application file for complete search history.

(56) References Cited

U.S. PATENT DOCUMENTS

| | | | |
|---|---|---|---|
| 6,078,511 A | 6/2000 | Fasullo et al. | |
| 6,351,360 B1 | 2/2002 | Kotowski et al. | |
| 6,717,530 B1 | 4/2004 | Schmidt et al. | |
| 6,816,351 B1 | 11/2004 | Frank et al. | |
| 6,861,824 B1 | 3/2005 | Liu et al. | |
| 6,867,573 B1 | 3/2005 | Carper | |

*Primary Examiner*—Abdelmoniem Elamin

(57) ABSTRACT

A system and method is disclosed that provides a thermal shutdown circuit that generates a plurality of temperature warning flag signals. Each temperature warning flag signal represents a different temperature. The thermal shutdown circuit comprises a plurality of inverter circuits in which each inverter circuit has a different temperature turn-on threshold. A temperature to binary code converter receives the temperature warning flag signals from the inverter circuits and generates a plurality of binary coded signals that represent a temperature that is detected by the thermal shutdown circuit. A host controller unit uses the temperature information from the binary coded signals to shut down subsystems in advance of an abrupt thermal shutdown of a system.

20 Claims, 6 Drawing Sheets

SYSTEM AND METHOD FOR PROVIDING A THERMAL SHUTDOWN CIRCUIT WITH TEMPERATURE WARNING FLAGS

TECHNICAL FIELD OF THE INVENTION

The present invention relates generally to the manufacture of semiconductor devices and, more particularly, to a system and method for providing a thermal shutdown circuit with temperature warning flags for use in a voltage regulator circuit.

BACKGROUND OF THE INVENTION

A thermal shutdown (TSD) circuit is a type of circuit that is often found in linear and switching regulators and power management devices. Almost all power regulator and converter integrated circuits have an on-chip thermal shutdown circuit that monitors the temperature of the integrated circuit die.

Prior art thermal shutdown circuits are usually designed to continually sense the temperature of an integrated circuit die (referred to as "the die temperature"). When the die temperature increases to a preselected threshold value of temperature (referred to as "the shutdown temperature"), the thermal shutdown circuit abruptly cuts off power to the integrated circuit. This results in an immediate shut down of the operations of the integrated circuit. A typical preselected shutdown temperature is about one hundred forty degrees Celsius (140° C.). Shutting down the operation of an integrated circuit at a shutdown temperature of 140° C. prevents further system damage due to heat and prevents fire hazards. Depending upon the circuit application involved, the preselected shutdown temperature may be in a range from about one hundred thirty degrees Celsius (130° C.) to one hundred seventy degrees Celsius (170° C.).

The abrupt cut off of power to a system is unacceptable for many of the complex and sophisticated portable devices in general use today (such as cellular phones, personal digital assistants, audio-video recording systems, etc.). Abruptly shutting down an electronic system (or any of its subsystems) without warning due to internal overheating or high ambient temperature can cause problems. The problems may range from simple inconvenience to the loss of data or even to damage to the system. Therefore the abrupt cut off of power to a system is to be avoided.

Some more sophisticated prior art approaches to the problem have utilized a dedicated temperature sensor integrated circuit that monitors the local temperature level. The temperature integrated circuit communicates temperature information to a host controller unit via a communications bus. The temperature integrated circuit is able to provide the host controller unit with warning signals that indicate the occurrence of increased levels of temperature. The warning signals give the host controller unit sufficient time to respond and initiate a timely shutdown sequence of operations before a critical temperature level is reached. The dedicated temperature sensor integrated circuit approach requires additional cost, additional area, and additional overhead to perform the temperature sensing function.

A dedicated temperature integrated circuit may be useful to manage global heating due to external ambient temperature for a portable electronic system. However, a dedicated temperature integrated circuit may not be useful to manage a localized increase in temperature (e.g., caused by an unscheduled high power dissipation or by a malfunction in some internal circuitry). For example, consider a cellular phone that has a power management unit integrated circuit (PMUIC). The PMUIC may contain a dozen or so voltage regulators. In addition, there may also be several more stand alone regulators distributed around the system board to power the power amplifier (PA), radio frequency (RF) low power amplifiers (LPA), temperature compensated crystal oscillator (TCXO), multimedia audio system, and other similar elements. A centralized thermal management system is not adequate to manage localized increases in temperature in such an extended system.

It would be advantageous to have a thermal shutdown (TSD) circuit that would not abruptly cut off power to a system that experiences a localized increase in temperature.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented for any type of suitably arranged thermal shutdown circuit.

Figure 1:
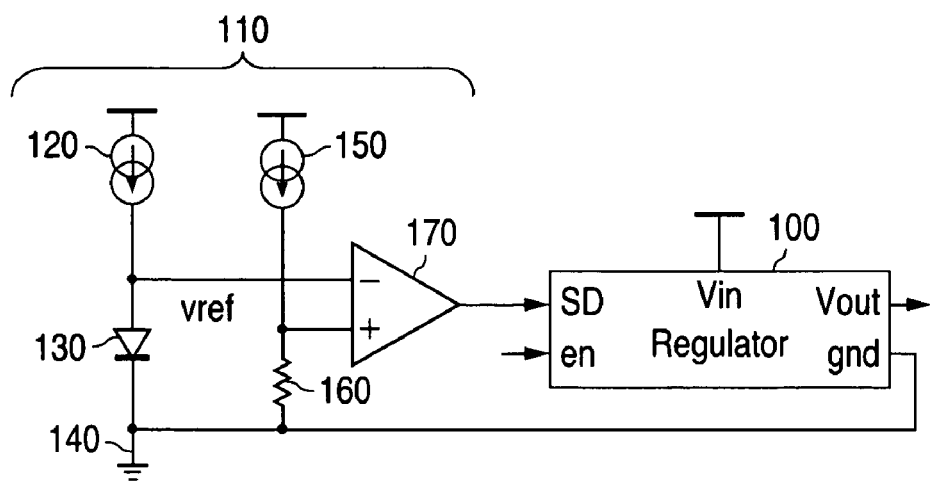
FIG. 1 illustrates a voltage regulator with a prior art thermal shutdown circuit.

FIG. 1 illustrates a prior art voltage regulator 100 with a prior art thermal shutdown circuit 110. The basic task of the thermal shutdown circuit 110 is to immediately cut the power at the output voltage (Vout) of the voltage regulator 100 when the die temperature reaches the preselected shutdown temperature.

Prior art thermal shutdown circuit 110 comprises a first current source 120 having an output coupled to an input of diode 130. The output of diode 130 is coupled to ground 140. The prior art thermal shutdown circuit 110 also comprises a second current source 150 having an output coupled to a first end of resistor 160. The second end of resistor 160 is coupled to ground 140.

Prior art thermal shutdown circuit 110 also comprises a comparator circuit 170. The inverting input of comparator circuit 170 is coupled to a node between the output of first current source 120 and the input of diode 130. The noninverting input of comparator circuit 170 is coupled to a node between the output of second current source 150 and the first end of resistor 160. The voltage at the node between the output of second current source 150 and the first end of resistor 160 is maintained at a selected reference voltage (Vref) by selecting an appropriate value of current for current source 150 and by selecting an appropriate value of resistance for resistor 160.

The output of comparator circuit 170 is coupled to an input (SD) of voltage regulator 100. Voltage regulator 100 has a ground output (gnd) that is coupled to ground 140. Voltage regulator 100 has an input (Vin) that is coupled to an input voltage and an output (Vout) provides the output voltage of voltage regulator 100.

Diode 130 is typically biased at about seven tenths of a volt (0.7 V) at a room temperature of about twenty five degrees Celsius (25° C.). The p-n juncture of diode 130 has a linear characteristic that decreases two millivolts (2.0 mV) per degree Celsius (° C.) of increasing temperature. Therefore, for example, at a temperature of about one hundred fifty degrees Celsius (150° C.) to one hundred sixty degrees Celsius (160° C.) the voltage across diode 130 approaches forty five hundredths of a volt (0.45 V).

Assume that the reference voltage Vref at the node between the output of second current source 150 and the first end of resistor 160 is set to a value that is just below forty five hundredths of a volt (0.45 V) (or equivalently, four hundred fifty millivolts (450 mV)). This voltage of reference voltage Vref corresponds to a shutdown temperature of about one hundred fifty degrees Celsius (150° C.). When the voltage on the node between the output of first current source 120 and the input of diode 130 reaches the value of the reference voltage Vref, the output of comparator circuit 170 goes "high" as the temperature that is impressed on diode 130 exceeds the shutdown voltage of one hundred fifty degrees Celsius (150° C.). Then the voltage regulator 100 abruptly cuts the output voltage (Vout) to a voltage level of zero volts (0.0 V). This is the manner of operation of a typical prior art thermal shutdown (TSD) circuit 110.

The present invention provides a unique approach to addressing the deficiencies of prior art thermal shutdown (TSD) circuits. As will be more fully described, the present invention provides an improved thermal shutdown (TSD) circuit that is able to continuously sense and report a range of temperature levels to a host controller unit (or to a similar type of processor unit). The thermal shutdown (TSD) circuit of the present invention may be constructed at a negligible increase in cost. In addition, the thermal shutdown (TSD) circuit of the present invention consumes a negligible amount of additional power.

As will also be more fully described, the thermal shutdown (TSD) circuit of the present invention is capable of sequentially issuing a plurality of warning flags as the level of temperature continues to rise. The warning flags provide an increased level of thermal management capability. With a plurality of warning flags to convey the status of the local temperature, the thermal shutdown (TSD) circuit of the present invention enables a host controller unit to negotiate system budget and performance parameters by adjusting power levels or clocking frequencies, and by modulating the performance of a cooling apparatus in response to a change in local (or global) temperature.

In this manner the thermal shutdown (TSD) circuit of the present invention can provide a conventional voltage regulator with the capability of an intelligent thermal management system. The features of the thermal shutdown (TSD) circuit of the present invention minimizes the cost and space requirements for a thermal shutdown (TSD) sensor device in many applications where thermal management is required.

If all on board power management units (PMU) and voltage regulators in a system employ the thermal shutdown (TSD) circuit of the present invention, then the system will have a distributed temperature sensing capability that can deliver a superior thermal monitoring capability to all power management circuits and the system board. Such a distributed temperature sensing capability greatly increases system reliability and performance.

Figure 2:
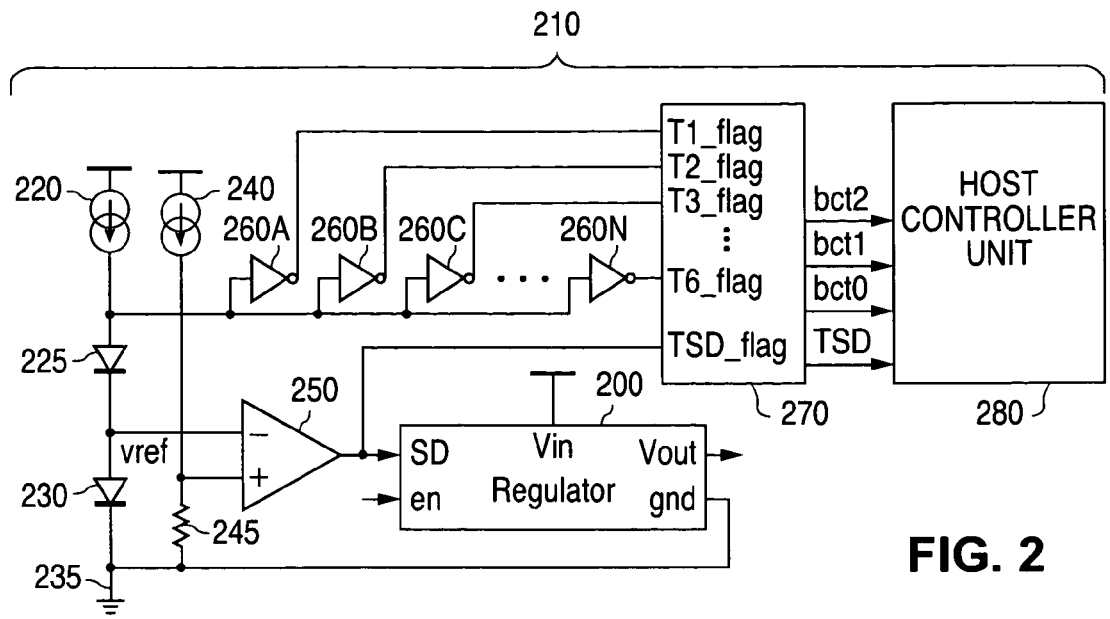
FIG. 2 illustrates a voltage regulator with a thermal shutdown circuit in accordance with the present invention.

FIG. 2 illustrates a voltage regulator 200 with a thermal shutdown circuit 210 of the present invention. The thermal shutdown circuit 210 generates a plurality of warning flags to indicate various levels of increased die temperature. The thermal shutdown circuit 210 cuts the power at the output voltage (Vout) of the voltage regulator 200 when the die temperature reaches the preselected shutdown temperature.

Thermal shutdown circuit 210 comprises a first current source 220 having an output coupled to an input of a first diode 225. The output of first diode 225 is coupled to an input of a second diode 230. The output of second diode 230 is coupled to ground 235. The thermal shutdown circuit 210 also comprises a second current source 240 having an output coupled to a first end of resistor 245. The second end of resistor 245 is coupled to ground 235.

Thermal shutdown circuit 210 also comprises a comparator circuit 250. The inverting input of comparator circuit 250 is coupled to a node between the output of first diode 225 and the input of second diode 330. The noninverting input of comparator circuit 250 is coupled to a node between the output of second current source 240 and the first end of resistor 245. The voltage at the node between the output of second current source 240 and the first end of resistor 245 is maintained at a selected reference voltage (Vref) by selecting an appropriate value of current for current source 240 and by selecting an appropriate value of resistance for resistor 245.

The output of comparator circuit 250 is coupled to an input (SD) of voltage regulator 200. Voltage regulator 200 has a ground output (gnd) that is coupled to ground 235. Voltage regulator 200 has an input (Vin) that is coupled to an input voltage and an output (Vout) provides the output voltage of voltage regulator 200.

Thermal shutdown circuit 210 also comprises a plurality of special inverter circuits 260. The inverter circuits 260 are custom designed so that each inverter circuit 260 has a different turn-on threshold. In one advantageous embodiment each inverter circuit 260 comprises two transistors coupled together in an inverter configuration. The inverter circuits 260 are used in place of conventional three terminal comparator circuits that are more complex and require higher levels of operating power. The inverter circuits 260 are arranged sequentially with respect to their turn-on thresholds so that as the temperature increases each inverter circuit 260 turns on in sequence.

The thermal shutdown circuit 210 comprises an integer number N of inverter circuits 260. FIG. 2 illustrates an exemplary advantageous embodiment in which there are six (6) inverter circuits (260A, 260B, 260C, . . . , 260N). It is understood that the invention is not limited to the use of six (6) inverter circuits 260 and that the use of six (6) inverter circuits 260 is merely one example.

The input of each inverter circuit 260 is coupled to a node between an output of the first current source 220 and the input of the first diode 225. The output of the first inverter circuit 260A is coupled to a first input of a Thermometer to Binary Code Converter 270. The output of first inverter circuit 260A produces a signal that is designated "T1_flag." A "high" signal on the "T1_flag" line means that a first level of die temperature has been reached.

The output of the second inverter circuit 260B is coupled to a second input of the Thermometer to Binary Code Converter 270. The output of second inverter circuit 260B produces a signal that is designated "T2_flag." A "high" signal on the "T2_flag" line means that a second level of die temperature has been reached. The second level of die temperature is higher than the first level of die temperature.

The output of the third inverter circuit 260C is coupled to a third input of the Thermometer to Binary Code Converter 270. The output of third inverter circuit 260C produces a signal that is designated "T3_flag." A "high" signal on the "T3_flag" line means that a third level of die temperature has been reached. The third level of die temperature is higher than the second level of die temperature.

Similarly, the outputs of the fourth and fifth inverter circuits (not shown in FIG. 2) are coupled to fourth and fifth inputs of the Thermometer to Binary Code Converter 270. The output of fourth inverter circuit (not shown) produces a signal that is designated "T4_flag." A "high" signal on the "T4_flag" line means that a fourth level of die temperature has been reached. The fourth level of die temperature is higher than the third level of die temperature. The output of fifth inverter circuit (not shown) produces a signal that is designated "T5_flag." A "high" signal on the "T5_flag" line means that a fifth level of die temperature has been reached. The fifth level of die temperature is higher than the fourth level of die temperature.

Lastly, the output of the sixth inverter circuit 260N is coupled to a sixth input of the Thermometer to Binary Code Converter 270. The output of sixth inverter circuit 260N produces a signal that is designated "T6_flag." A "high" signal on the "T6_flag" line means that a sixth level of die temperature has been reached. The sixth level of die temperature is higher than the fifth level of die temperature.

The Thermometer to Binary Code Converter 270 uses the signal information from the warning flag lines (i.e., "T1_flag" through "T6_flag") to generate three binary code signals. The first binary code signal is designated "binary code temp flag_0" and is abbreviated "bct0". The second binary code signal is designated "binary code temp flag_1" and is abbreviated "bct1". The third binary code signal is designated "binary code temp flag_2" and is abbreviated "bct2".

The binary code signals indicate the levels of temperature that have been detected. When the "T1_flag" signal goes "high", then the "bct0" signal also goes "high". Later, when the "T2_flag" signal goes "high", then the "bct1" signal goes "high" and the "bct0" signal goes "low". Later, when the "T3_flag" signal goes "high", then the "bct1" remains "high" and the "bct0" signal goes "high". When both of the "bct0" and the "bct1" signals are "high", this means that the die temperature has reached the "T3_flag" temperature.

Figure 3:
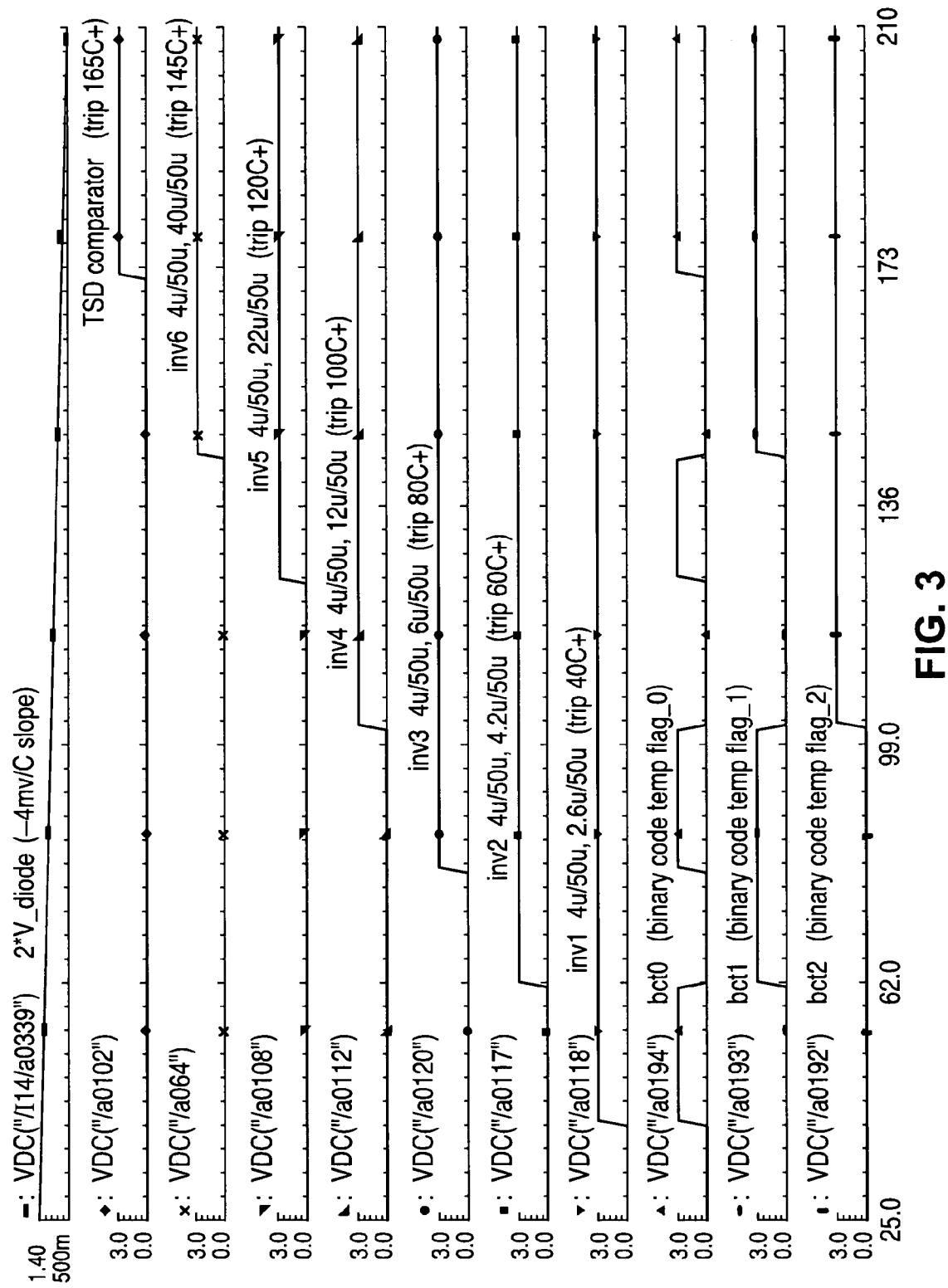
FIG. 3 illustrates a graph showing the relationship between temperature and the assertion of six temperature warning flags and three binary code signals of the thermal shutdown circuit of the present invention.

When the temperature increases to the "T4_flag" level the "bct2" signal goes "high" and both of the "bct0" and "bct1" signals go "low". When the temperature increases to the "T5_flag" level the "bct2" signal remains "high" and the "bct0" signal goes "high". When the temperature increases to the "T6_flag" level the "bct2" signal remains "high" and the "bct0" signal goes "low" and the "bct1" signal goes "high". Examples of the binary code signals "bct0", "bct1" and "bct2" are shown in FIG. 3.

The settings of the various states of the binary code signals "bct0", "bct1" and "bct2" with respect to the settings of the temperature flags are shown in TABLE ONE below:

TABLE ONE

| T6 | T5 | T4 | T3 | T2 | T1 | bct2 | bct1 | bct0 |
|----|----|----|----|----|----|------|------|------|
| 0  | 0  | 0  | 0  | 0  | 0  | 0    | 0    | 0    |
| 0  | 0  | 0  | 0  | 0  | 1  | 0    | 0    | 1    |
| 0  | 0  | 0  | 0  | 1  | 1  | 0    | 1    | 0    |
| 0  | 0  | 0  | 1  | 1  | 1  | 0    | 1    | 1    |
| 0  | 0  | 1  | 1  | 1  | 1  | 1    | 0    | 0    |
| 0  | 1  | 1  | 1  | 1  | 1  | 1    | 0    | 1    |
| 1  | 1  | 1  | 1  | 1  | 1  | 1    | 1    | 0    |

The output of comparator circuit 250 is also coupled to a seventh input of the Thermometer to Binary Code Converter 270. The output of comparator circuit 250 produces a signal that is designated "thermal shutdown flag" or "TSD_flag." A "high" signal on the "TSD_flag" line means that the shutdown temperature has been reached. The shutdown temperature is higher than the sixth level of die temperature that is associated with the "T6_flag".

When the output of comparator circuit 250 goes "high" (i.e., the "TSD_flag" is "high") then the voltage regulator 200 abruptly cuts the output voltage (Vout) to a voltage level of zero volts (0.0 V). When the "TSD_flag" goes "high" then the "bct0" signal also goes "high" so that all three of the binary code signal ("bct0", "bct1" and "bct2") are at a "high" level.

As shown in FIG. 2, the Thermometer to Binary Code Converter 270 provides the binary code signals ("bct0", "bct1" and "bct2") and the thermal shutdown flag signal ("TSD_flag") to a host controller unit 280. As previously mentioned, host controller unit 280 is capable of utilizing the warning flag information from the Thermometer to Binary Code Converter 270 to negotiate system budget and performance parameters by adjusting power levels or clocking frequencies, and by modulating the performance of a cooling apparatus in response to a change in local (or global) temperature. The warning flag information that is provided by thermal shutdown circuit 210 of the present invention greatly enhances the thermal management capability of a system.

The presence of the first diode 225 in the thermal shutdown circuit 210 extends the range of the voltage developed by the first diode 225 and second diode 230 to approximately one and four tenths volt (1.4 V) at a room temperature of about twenty five degrees Celsius (25° C.). This design accommodates the plurality of inverter circuits 260 that have different logic thresholds. The inverter circuits 260 are designed to consume a few hundred nanoamperes (nA) of current (and much less than one microampere (1 µA) of current) over a temperature range of minus forty five degrees Celsius (−45° C.) to one hundred twenty five degrees Celsius (125° C.).

The inverter circuits 260 of the thermal shutdown circuit 210 of the present invention simplify and enhance the temperature detection process. The temperature detection process of the present invention is accomplished without using supplemental circuit elements such as additional comparator circuits, additional resistors, and additional reference voltage sources. Additional circuit elements of this type require additional power to operate and require additional silicon area to implement. The present invention efficiently performs the function of temperature detection without such additional circuit elements.

FIG. 3 illustrates the relationship between temperature and the assertion of the various thermal warning flags of thermal shutdown circuit 210. The voltages of the thermal warning flags and the binary code signals are plotted as a function of temperature in degrees Celsius (° C.). In FIG. 3 the signal for the first thermal warning flag "T1_flag" is designated "inv1". The "T1_flag" goes "high" at a temperature of approximately forty degrees Celsius (40° C.). The signal for the second thermal warning flag "T2_flag" is designated "inv2". The "T2_flag" goes "high" at a temperature of approximately sixty degrees Celsius (60° C.).

In FIG. 3 the signal for the third thermal warning flag "T3_flag" is designated "inv3". The "T3_flag" goes "high" at a temperature of approximately eighty degrees Celsius (80° C.). The signal for the fourth thermal warning flag "T4_flag" is designated "inv4". The "T4_flag" goes "high" at a temperature of approximately one hundred degrees Celsius (100° C.).

In FIG. 3 the signal for the fifth thermal warning flag "T5_flag" is designated "inv5". The "T5_flag" goes "high" at a temperature of approximately one hundred twenty degrees Celsius (120° C.). The signal for the sixth thermal warning flag "T6_flag" is designated "inv6". The "T6_flag" goes "high" at a temperature of approximately one hundred forty five degrees Celsius (145° C.).

In FIG. 3 the signal for the thermal shutdown signal "TSD_flag" is designated "TSD comparator". The "TSD_flag" goes "high" at a temperature of approximately one hundred sixty five degrees Celsius (165° C.).

FIG. 3 also illustrates the relationship between temperature and the assertion of the three binary code signals ("bct0", "bct1" and "bct2") of thermal shutdown circuit 210. As previously described, the three binary code signals provide the host controller unit 280 with information concerning the status of the six thermal warning flags of thermal shutdown circuit 210.

Figure 4:
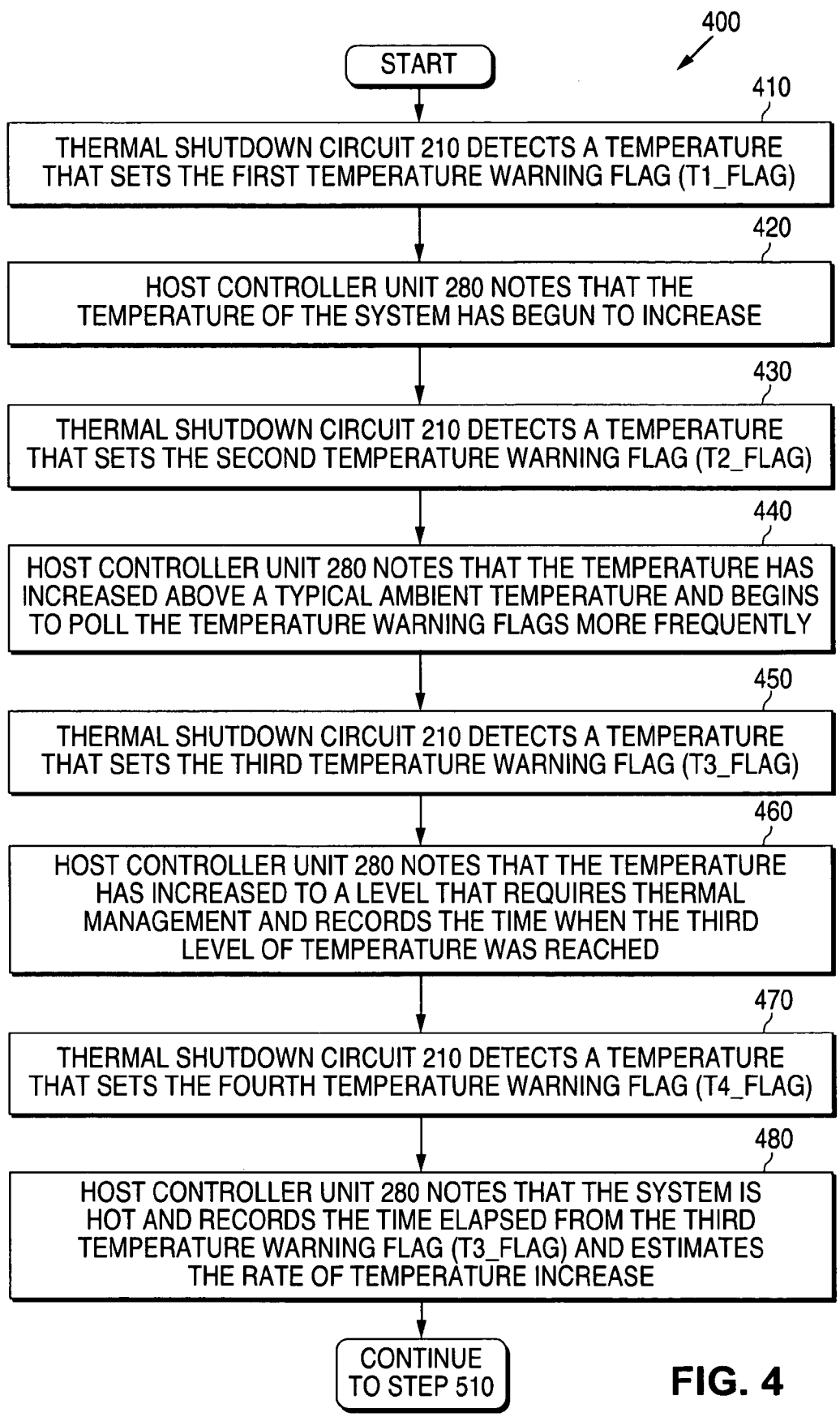
FIG. 4 illustrates a flow chart showing the steps of an advantageous embodiment of a first portion of a method of operation of the present invention.

FIG. 4 is a flow chart 400 showing the steps of an advantageous embodiment of a first portion of a method of operation of the present invention. In the first step of the method of operation the thermal shutdown circuit 210 detects a temperature that sets the first temperature warning flag (the T1_flag) (step 410). The host controller unit 280 receives the first temperature warning flag and notes that the temperature of the system has begun to increase (step 420).

Then the thermal shutdown circuit 210 detects a temperature that sets the second temperature warning flag (the T2_flag) (step 430). The host controller unit 280 receives the second temperature warning flag and (1) notes that the temperature of the system has increased above a typical ambient temperature, and (2) begins to poll the temperature warning flags more frequently (step 440).

Then the thermal shutdown circuit 210 detects a temperature that sets the third temperature warning flag (the T3_flag) (step 450). The host controller unit 280 receives the third temperature warning flag and (1) notes that the temperature of the system has increased to a level that requires thermal management, and (2) records the time when the third level of temperature was reached (step 460).

The thermal shutdown circuit 210 detects a temperature that sets the fourth temperature warning flag (the T4_flag) (step 470). The host controller unit 280 receives the fourth temperature warning flag and (1) notes that the temperature of the system is hot, and (2) records the time elapsed from when the third level of temperature was reached until the fourth level of temperature was reached, and (3) estimates the rate of temperature increase (step 480). Control of the method of operation then passes to step 510 as set forth in FIG. 5.

Figure 5:
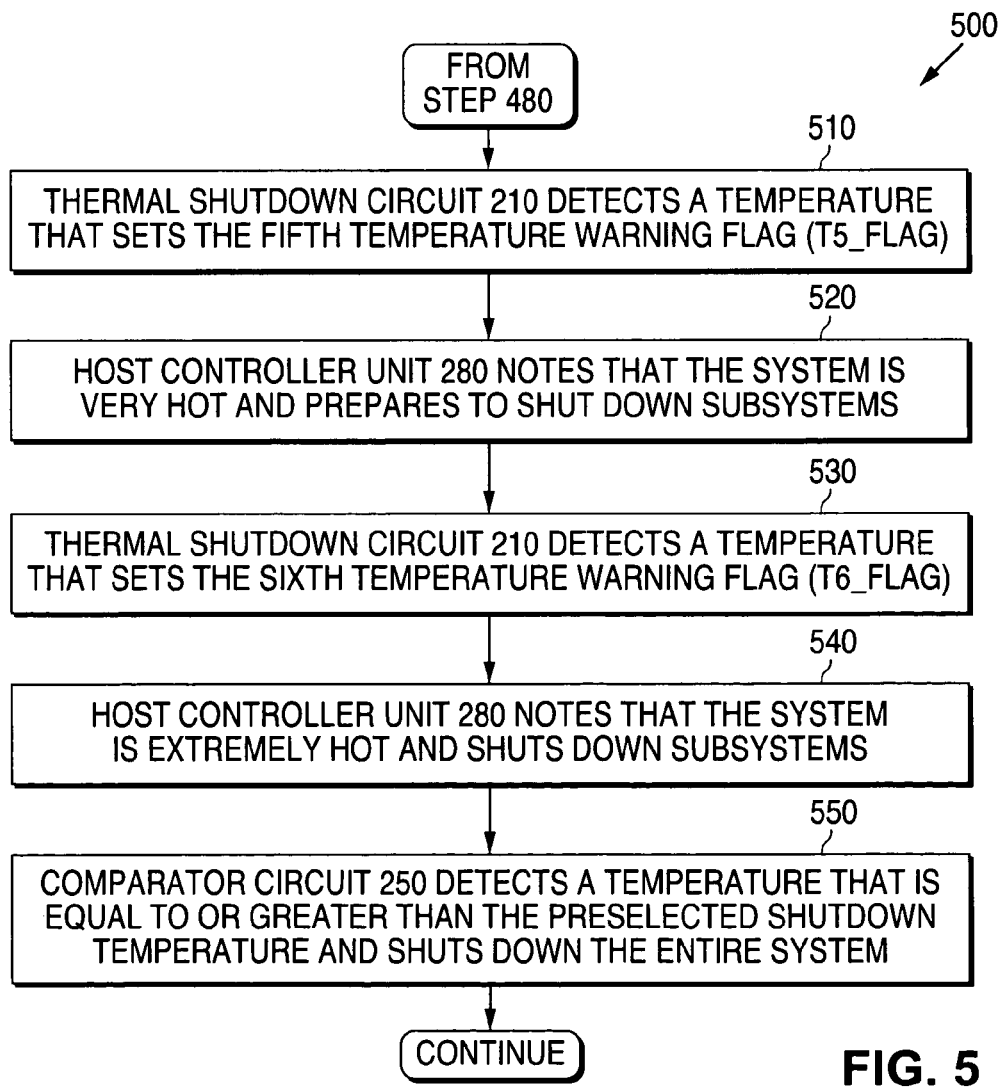
FIG. 5 illustrates a flow chart showing the steps of an advantageous embodiment of a second portion of a method of operation of the present invention.

FIG. 5 illustrates a flow chart 500 showing the steps of an advantageous embodiment of a second portion of a method of operation of the present invention. The thermal shutdown circuit 210 then detects a temperature that sets the fifth temperature warning flag (the T5_flag) (step 510). The host controller unit 280 receives the fifth temperature warning flag and (1) notes that the temperature of the system is very hot, and (2) prepares to shut down subsystems (step 520).

The thermal shutdown circuit 210 then detects a temperature that sets the sixth temperature warning flag (the T6_flag) (step 530). The host controller unit 280 receives the sixth temperature warning flag and (1) notes that the temperature of the system is extremely hot, and (2) shuts down subsystems (step 540). The comparator circuit 250 then detects a temperature that is equal to or greater than the preselected shutdown temperature and shuts down the entire system (step 550).

The method of operation of the present invention provides several benefits. A first benefit is the ability to provide multiple levels of temperature warning. A second benefit is the ability to provide an active system of thermal management control. A third benefit is the ability to provide a host controller unit that can shut down various subsystems in advance of an abrupt thermal shutdown of an entire system. A fourth benefit is that one advantageous embodiment of the temperature shutdown circuit of the present invention only requires the addition of one diode (i.e., one p-n junction) and one inverter for each temperature warning flag that is needed.

A fifth benefit is that the temperature shutdown circuit of the present invention consumes only a negligible amount of additional power. A sixth benefit is the use of N simple customized inverter-comparators (inverter circuits 260) in place of conventional three terminal comparators for the detection of the temperature trip points. The inverter circuits 260 consume very low levels of power and are more compact than conventional three terminal comparators.

Although the present invention has been described in an embodiment that comprises six inverters, it is understood that the principles of the present invention encompass and extend to embodiments that comprise a plurality of N inverters where N is a positive integer.

Although the present invention has been described in an embodiment that comprises two diodes and one comparator circuit (in one thermal shutdown (TSD) circuit), it is understood that the principles of the present invention encompass and extend to embodiments that comprise a plurality of N diodes where N is a positive integer and a plurality of M comparator circuits where M is a positive integer (in a distributed thermal shutdown (TSD) implementation with multiple thermal shutdown (TSD) circuits).

Figure 6:
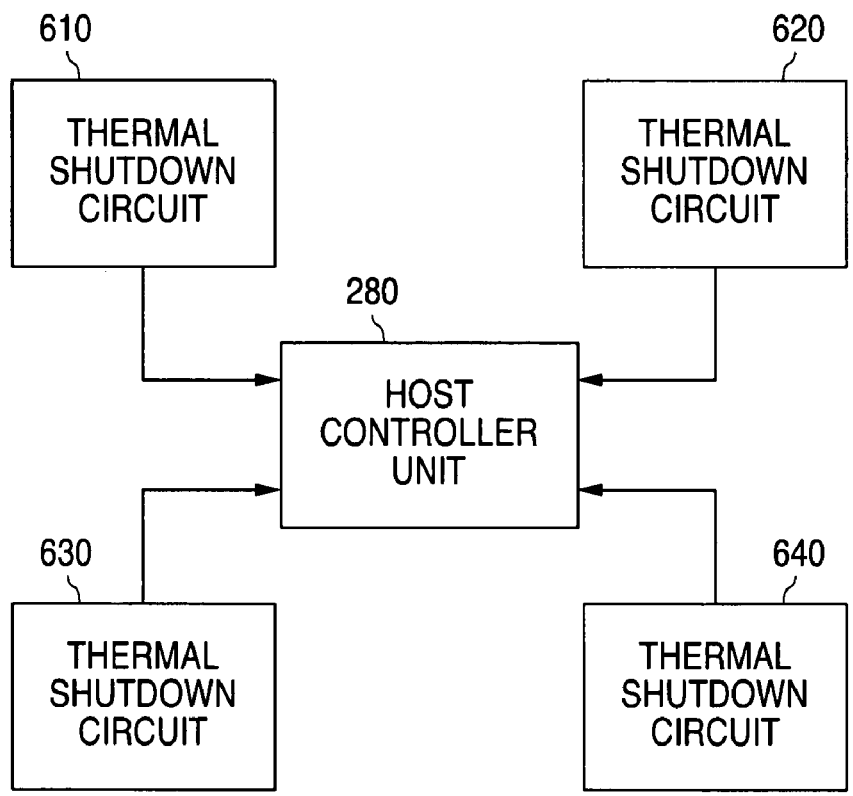
FIG. 6 illustrates a block diagram of a thermal shutdown system that comprises a plurality of thermal shutdown circuits of the present invention.

FIG. 6 illustrates a block diagram of one advantageous embodiment of a thermal shutdown system 600 that comprises a plurality of thermal shutdown circuits (610, 620, 630, 640) of the present invention. As shown in FIG. 6, each of the thermal shutdown circuits (610, 620, 630, 640) is coupled to a centrally located host controller unit 280. Each of the thermal shutdown circuits (610, 620, 630, 640) monitors the local temperature of a different area of the entire system. Although four thermal shutdown circuits are shown in FIG. 6, it is understood that the invention is not limited to the use of four thermal shutdown circuits. The illustration showing four thermal shutdown circuits is merely one example.

In this embodiment thermal shutdown system 600 has a distributed temperature sensing capability that can deliver a superior thermal monitoring capability to power management circuits throughout the system. As previously mentioned, the distributed temperature sensing capability of a system such as thermal shutdown system 600 greatly increases system reliability and performance.

Figure 7A:
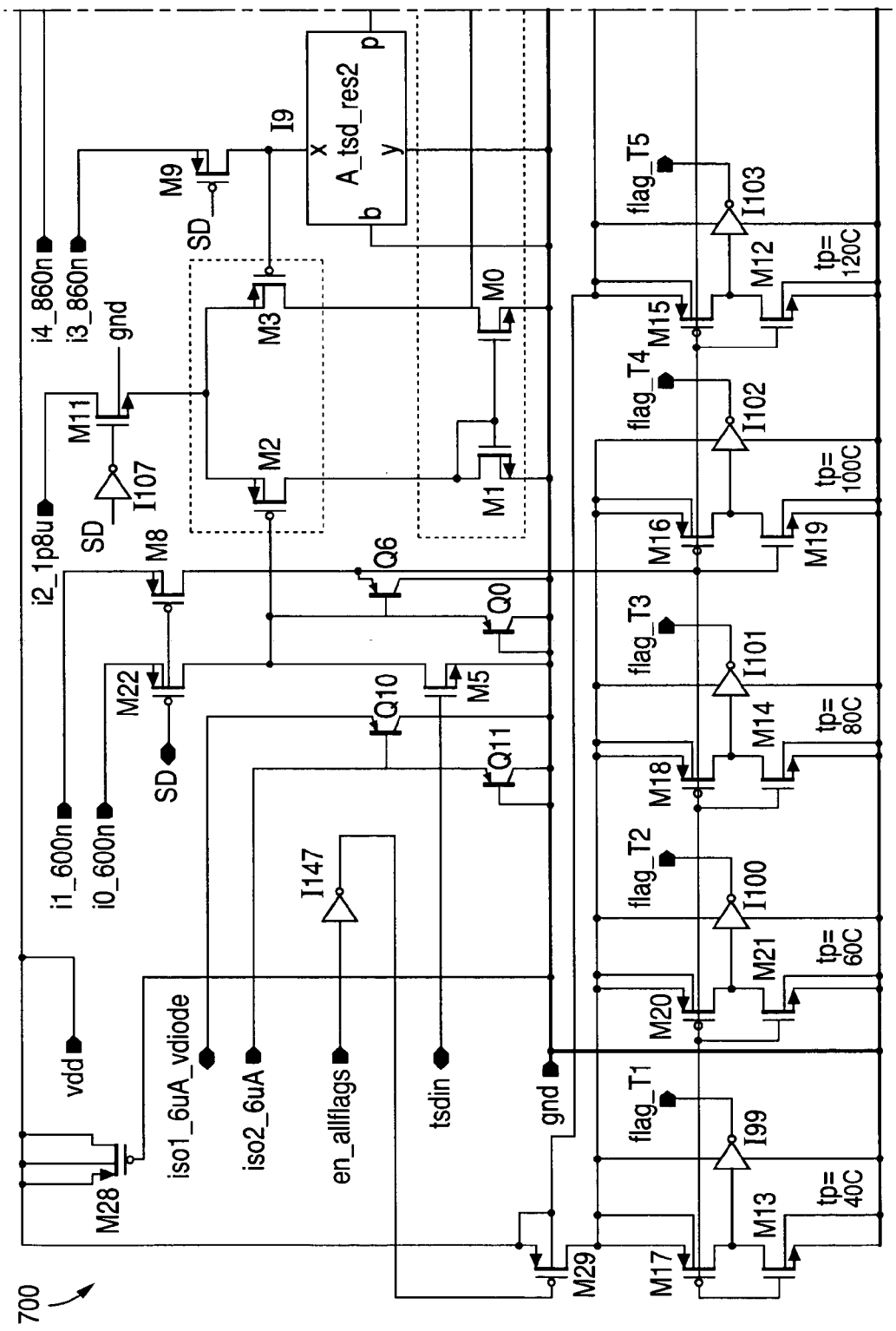
FIG. 7 illustrates a circuit diagram of an advantageous embodiment of a thermal shutdown circuit of the present invention.
Figure 7B:
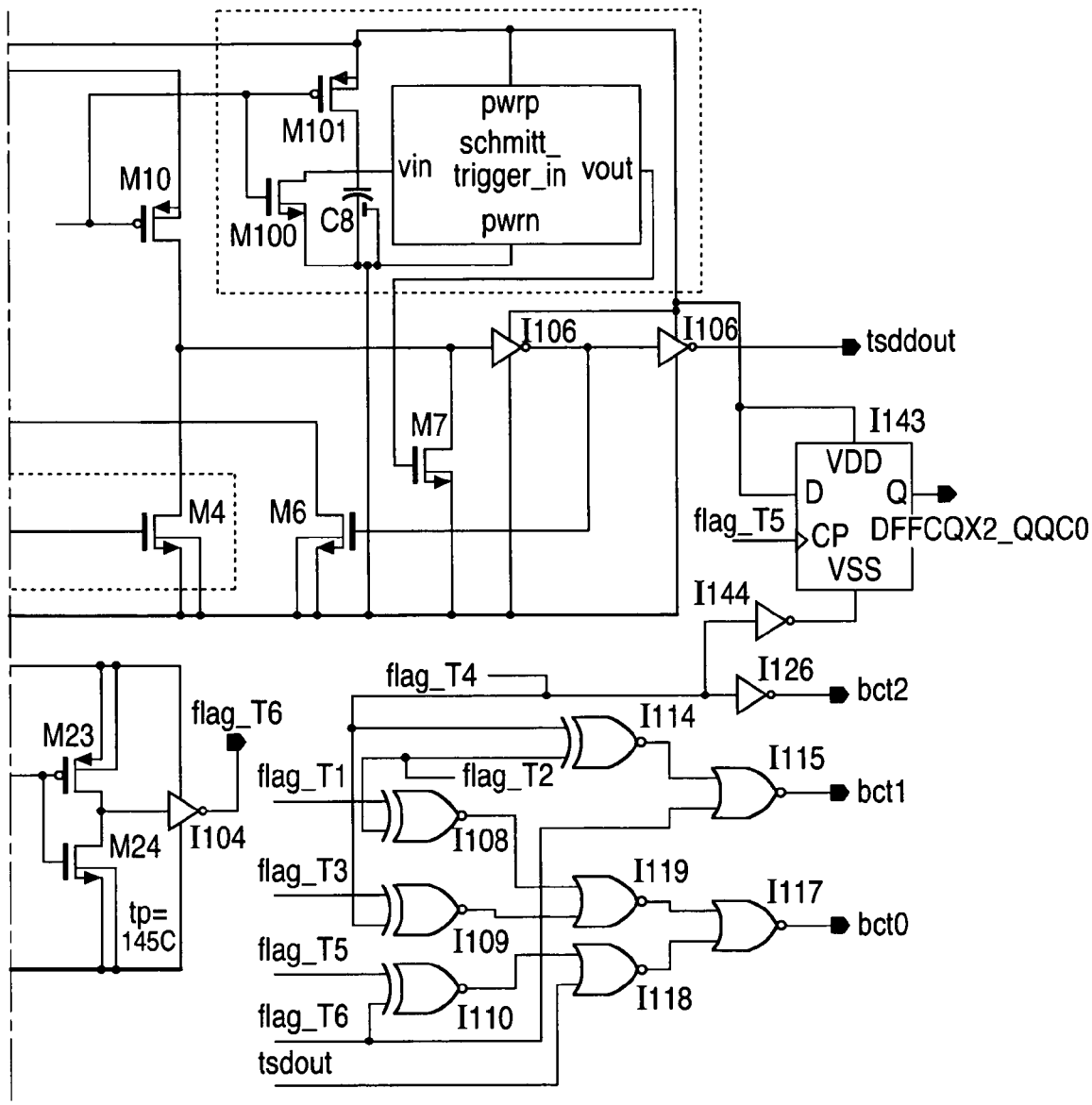

FIG. 7 illustrates a circuit diagram 700 of an advantageous embodiment of a thermal shutdown circuit of the present invention. The circuit diagram 700 is set forth to assist persons who are skilled in the art in manufacturing the thermal shutdown circuit of the present invention.

Although the present invention has been described with several embodiments, various changes and modifications may be suggested to one skilled in the art. It is intended that the present invention encompass such changes and modifications as fall within the scope of the appended claims.

What is claimed is:

1. A thermal shutdown circuit comprising circuitry that generates a plurality of thermal warning flag signals in which each thermal warning flag signal represents a different temperature wherein said circuitry that generates said plurality of thermal warning flag signals comprises:
   a first current source;
   a first diode coupled to an output of said first current source; and
   a plurality of inverter circuits, wherein an input of each inverter circuit is coupled to a node between said output of said first current source and an input of said first diode;
   wherein each inverter circuit is capable of turning on at a different temperature and generating a temperature warning flag signal that represents a detection of a said temperature.

2. The thermal shutdown circuit as set forth in claim 1 wherein each inverter circuit of said plurality of inverter circuits comprises two transistors coupled together in an inverter configuration and wherein each inverter circuit has a different temperature turn-on threshold.

3. The thermal shutdown circuit as set forth in claim 2 wherein said plurality of inverter circuits are sequentially arranged in order of an increasing size of said temperature turn-on threshold.

4. The thermal shutdown circuit as set forth in claim 3 further comprising:
   a temperature to binary code converter coupled to an output of each of said plurality of inverter circuits;
   wherein said temperature to binary code converter, in response to receiving temperature warning flag signal information from each of said plurality of inverter circuits, generates a plurality of binary coded signals that represent a temperature that is detected by said thermal shutdown circuit.

5. The thermal shutdown circuit as set forth in claim 4 further comprising:
   a host controller unit coupled to said temperature to binary code converter that receives said plurality of binary coded signals from said temperature to binary code converter, and in response to said temperature that is represented by said plurality of binary coded signals, changes one of: a power level, a clocking frequency, and a performance of a cooling apparatus for an integrated circuit system.

6. The thermal shutdown circuit as set forth in claim 5 wherein said host controller unit receives said plurality of binary coded signals from said temperature to binary code converter, and in response to said temperature that is represented by said plurality of binary coded signals, shuts down at least one subsystem of an integrated circuit system in advance of an abrupt thermal shutdown of said integrated circuit system.

7. The thermal shutdown circuit as set forth in claim 3 wherein said plurality of inverter circuits comprises N inverter circuits, where N is an integer, comprising:
   a first inverter circuit that generates a first temperature warning flag signal that represents a detection of a first temperature;
   a second inverter circuit that generates a second temperature warning flag signal that represents a detection of a second temperature that is higher than said first temperature; and
   an Nth inverter circuit that generates an Nth temperature warning flag signals that represents a detection of an Nth temperature that is higher than an (N−1)th temperature.

8. A thermal shutdown circuit comprising:
   a first current source;
   a first diode coupled to an output of said first current source;
   a second diode coupled to an output of said first diode;
   a plurality of inverter circuits, wherein an input of each inverter circuit is coupled to a node between said output of said first current source and an input of said first diode;
   wherein each inverter circuit is capable of turning on at a different temperature and generating a temperature warning flag signal that represents a detection of said temperature; and
   a second current source;
   a resistor coupled to an output of said second current source; and
   a comparator circuit having an inverting input coupled to a node between said output of said first diode and said input of said second diode, and having a noninverting input coupled to a node between said output of said second current source and said resistor.

9. The thermal shutdown circuit as set forth in claim 8 wherein each inverter circuit of said plurality of inverter circuits comprises two transistors coupled together in an inverter configuration and wherein each inverter circuit has a different temperature turn-on threshold.

10. The thermal shutdown circuit as set forth in claim 9 wherein said plurality of inverter circuits are sequentially arranged in order of an increasing size of said temperature turn-on threshold.

11. The thermal shutdown circuit as set forth in claim 10 further comprising:
   a temperature to binary code converter coupled to an output of each of said plurality of inverter circuits;
   wherein said temperature to binary code converter, in response to receiving temperature warning flag signal information from each of said plurality of inverter circuits, generates a plurality of binary coded signals that represent a temperature that is detected by said thermal shutdown circuit.

12. The thermal shutdown circuit as set forth in claim 11 wherein an output of said comparator circuit is coupled to an input of said temperature to binary code converter.

13. The thermal shutdown circuit as set forth in claim 11 further comprising:
a host controller unit coupled to said temperature to binary code converter that receives said plurality of binary coded signals from said temperature to binary code converter, and in response to said temperature that is represented by said plurality of binary coded signals, changes one of:
a power level, a clocking frequency, and a performance of a cooling apparatus for an integrated circuit system.

14. The thermal shutdown circuit as set forth in claim 11 wherein said host controller unit receives said plurality of binary coded signals from said temperature to binary code converter, and in response to said temperature that is represented by said plurality of binary coded signals, shuts down at least one subsystem of an integrated circuit system in advance of an abrupt thermal shutdown of said integrated circuit system.

15. The thermal shutdown circuit as set forth in claim 11 wherein said plurality of inverter circuits comprises N inverter circuits, where N is an integer, comprising:
a first inverter circuit that generates a first temperature warning flag signal that represents a detection of a first temperature;
a second inverter circuit that generates a second temperature warning flag signal that represents a detection of a second temperature that is higher than said first temperature; and
an Nth inverter circuit that generates an Nth temperature warning flag signal that represents a detection of an Nth temperature that is higher than an (N−1)th temperature.

16. A thermal shutdown system comprising:
a host controller unit; and
a plurality of thermal shutdown circuits coupled to said host controller unit;
wherein each thermal shutdown circuit of said plurality of thermal shutdown circuits comprises circuitry that generates a plurality of thermal warning flag signals in which each thermal warning flag signal represents a different temperature wherein each thermal shutdown circuit comprises:
a first current source;
a first diode coupled to an output of said first current source; and
a plurality of inverter circuits, wherein an input of each inverter circuit is coupled to a node between said output of said first current source and an input of said first diode;
wherein each inverter circuit is capable of turning on at a different temperature and generating a temperature warning flag signal that represents a detection of a said temperature.

17. The thermal shutdown system as set forth in claim 16 wherein each inverter circuit of said plurality of inverter circuits comprises two transistors coupled together in an inverter configuration and wherein each inverter circuit has a different temperature turn-on threshold; and
wherein said plurality of inverter circuits are sequentially arranged in order of an increasing size of said temperature turn-on threshold.

18. The thermal shutdown system as set forth in claim 17 wherein each thermal shutdown circuit of said plurality of thermal shutdown circuits comprises:
a temperature to binary code converter coupled to an output of each of said plurality of inverter circuits and coupled to a plurality of inputs of said host controller unit;
wherein said temperature to binary code converter, in response to receiving temperature warning flag signal information from each of said plurality of inverter circuits, generates a plurality of binary coded signals that represent a temperature that is detected by said thermal shutdown circuit, and provides said plurality of binary coded signals to said host controller unit.

19. The thermal shutdown circuit as set forth in claim 18 wherein said host controller receives said plurality of binary coded signals from said temperature to binary code converter, and in response to said temperature that is represented by said plurality of binary coded signals, changes one of: a power level, a clocking frequency, and a performance of a cooling apparatus for an integrated circuit system.

20. The thermal shutdown circuit as set forth in claim 19 wherein said host controller unit receives said plurality of binary coded signals from said temperature to binary code converter, and in response to said temperature that is represented by said plurality of binary coded signals, shuts down at least one subsystem of an integrated circuit system in advance of an abrupt thermal shutdown of said integrated circuit system.

* * * * *